United States Patent
Shua

(10) Patent No.: US 8,615,655 B2
(45) Date of Patent: Dec. 24, 2013

(54) METHODS AND DEVICES FOR PACKET TAGGING USING IP INDEXING VIA DYNAMIC-LENGTH PREFIX CODE

(75) Inventor: Avi Shua, Ramat Gan (IL)

(73) Assignee: Check Point Software Technologies, Ltd., Tel Aviv (IL)

( * ) Notice: Subject to any disclaimer, the term of this patent is extended or adjusted under 35 U.S.C. 154(b) by 794 days.

(21) Appl. No.: 12/357,434

(22) Filed: Jan. 22, 2009

(65) Prior Publication Data

US 2010/0183014 A1 Jul. 22, 2010

(51) Int. Cl.
*H04L 29/06* (2006.01)
(52) U.S. Cl.
USPC ............... 713/160; 713/161; 713/162; 726/3
(58) Field of Classification Search
USPC .............................................................. 726/3
See application file for complete search history.

(56) References Cited

U.S. PATENT DOCUMENTS

| | | | | | |
|---|---|---|---|---|---|
| 4,980,913 | A * | 12/1990 | Skret | ............................... | 713/153 |
| 6,529,518 | B1 * | 3/2003 | Webber | ........................... | 370/403 |
| 6,886,036 | B1 * | 4/2005 | Santamäki et al. | ............ | 709/223 |
| 7,028,337 | B2 * | 4/2006 | Murakawa | ........................ | 726/15 |
| 7,366,170 | B2 * | 4/2008 | Umesawa et al. | .............. | 370/389 |
| 7,502,860 | B1 * | 3/2009 | Champagne | .................... | 709/227 |
| 7,676,674 | B2 * | 3/2010 | Bush et al. | ...................... | 713/165 |
| 7,823,194 | B2 * | 10/2010 | Shay | ................................ | 726/13 |
| 7,920,510 | B2 * | 4/2011 | Kim | ................................ | 370/328 |
| 7,940,761 | B2 * | 5/2011 | Umesawa et al. | .............. | 370/389 |
| 7,965,659 | B1 * | 6/2011 | Doran | ............................ | 370/260 |
| 7,979,692 | B1 * | 7/2011 | Washington et al. | .......... | 713/153 |
| 8,027,262 | B2 * | 9/2011 | Kawarai et al. | ................ | 370/241 |
| 8,077,707 | B2 * | 12/2011 | Isnardi | ............................ | 370/389 |
| 8,266,327 | B2 * | 9/2012 | Kumar et al. | ................... | 709/250 |
| 2004/0098620 | A1 * | 5/2004 | Shay | ............................... | 713/201 |
| 2005/0094637 | A1 * | 5/2005 | Umesawa et al. | .............. | 370/389 |
| 2005/0265356 | A1 * | 12/2005 | Kawarai et al. | ........... | 370/395.53 |
| 2006/0056629 | A1 * | 3/2006 | Adamson et al. | .............. | 380/255 |
| 2006/0090065 | A1 * | 4/2006 | Bush et al. | ...................... | 713/153 |
| 2006/0098645 | A1 * | 5/2006 | Walkin | ........................... | 370/389 |
| 2007/0005801 | A1 * | 1/2007 | Kumar et al. | ................... | 709/238 |
| 2007/0008884 | A1 * | 1/2007 | Tang | ............................... | 370/230 |
| 2007/0067464 | A1 * | 3/2007 | Bardachenko et al. | ........ | 709/227 |
| 2007/0101154 | A1 * | 5/2007 | Bardsley et al. | ............... | 713/186 |
| 2008/0155670 | A1 * | 6/2008 | Umesawa et al. | .................. | 726/6 |
| 2009/0228700 | A1 * | 9/2009 | Hubbell | ........................ | 713/153 |

OTHER PUBLICATIONS

Helman et al., "Data Compression," Feb. 1988, IEEE, pp. 25-29.*

(Continued)

*Primary Examiner* — Luu Pham
(74) *Attorney, Agent, or Firm* — Mark M. Friedman

(57) ABSTRACT

Methods including the steps of: upon sending an IP packet, obtaining, by a sender, a sender identity for a sender of the packet; securely tagging, by a sender, the packet with the sender identity, the packet having a plurality of fixed-length fields concatenated into a single fixed-length virtual field shared between a cryptographic hash and an identity index for supporting multiple distinct identities residing on an IP endpoint; determining, by a receiver, the sender identity by extracting it from the packet; checking, by the receiver, the packet to ensure the packet has been appropriately tagged; and enforcing a security policy, by the receiver, according to the sender identity. Preferably, the step of obtaining includes: accessing, by the sender, a server for obtaining the sender identity; and associating, by the server, the sender identity with the endpoint. Most preferably, the associating is performed using a prefix code for encoding the identities.

18 Claims, 5 Drawing Sheets

(56) References Cited

OTHER PUBLICATIONS

D. Forsberg, "Use Cases of Implicit Authentication and Key Establishment with Sender and Receiver ID Binding," IEEE, 2007, pp. 1-8.*

Rui et al., "Network Access Control Mechanism Based on Locator/Identifier Split," IEEE, 2009, pp. 171-175.*

U.S. Appl. No. 12/056,462, filed Mar. 2008, Motil et al.

* cited by examiner

METHODS AND DEVICES FOR PACKET TAGGING USING IP INDEXING VIA DYNAMIC-LENGTH PREFIX CODE

FIELD AND BACKGROUND OF THE INVENTION

The present invention relates to methods and devices for packet tagging using IP (internet protocol) indexing via dynamic-length prefix code.

In recent years, security has become an increasing concern in information systems. This issue has become more significant with the advent of the Internet and the ubiquitous use of network environments (e.g. LAN and WAN). An important area of IT security is ensuring that only authorized and well-secured machines are allowed access into a local network. This area is known as Network Access Control or NAC.

In the prior art, U.S. patent application Ser. No. 12/056,462 by Motil et al. (hereinafter Motil '462) filed on 27 Mar. 2008, and assigned to the assignee of the present invention, discloses methods and devices for enforcing network access control utilizing secure packet tagging, and is incorporated by reference as if fully set forth herein.

A problem arises in current prior-art solutions when multiple identities "behind" the same IP address need to be distinguished by the Policy Enforcement Point (PEP, typically implemented on a security gateway). While packet tagging allows the PEP to validate the source of IP packets, it does not provide solutions to situations in which different users share the same IP address. These situations include:

(1) NAT (Network Address Translation) devices between the clients and the PEP; and
(2) multiple users sharing the same machine (e.g. normal multi-user operating systems, or terminal services).

Since the amount of space (number of bits) that can be used for packet tagging is severely limited, there is a clear trade-off between the use of this space for distinguishing multiple entities, and for security (e.g. in the form of a cryptographic hash). Therefore, a dynamic solution, in which the number of entities is determined at run-time, can optimize such a trade-off by maximizing the number of bits used to provide security.

It would be desirable to have methods and devices for packet tagging using IP indexing via dynamic-length prefix code. Such methods and devices would, among other things, provide an ability to distinguish between different identities that share the same IP address in order to allow the PEP to give each one of the users his/her own network access.

SUMMARY OF THE INVENTION

It is the purpose of the present invention to provide methods and devices for packet tagging using IP indexing via dynamic-length prefix code.

Therefore, according to the present invention, there is provided for the first time a method for packet tagging, the method including the steps of: (a) upon sending an IP packet, obtaining, by a sender module, a sender identity for a sender of the IP packet; (b) securely tagging, by the sender module, the IP packet with the sender identity, wherein the IP packet includes a plurality of fixed-length fields, wherein the fixed-length fields are concatenated into a single fixed-length virtual field, and wherein the virtual field is shared between a cryptographic hash and an identity index for supporting multiple distinct identities residing on an IP endpoint; (c) determining, by a receiver module, the sender identity by extracting the sender identity from the IP packet; (d) checking, by the receiver module, the IP packet to ensure the IP packet has been appropriately tagged; and (e) enforcing a security policy, by the receiver module, according to the sender identity.

Preferably, the method further includes the step of: (f) prior to the step of tagging, dynamically partitioning, by the sender module, the virtual field to support a dynamically changing number of the multiple distinct identities for the IP endpoint, wherein the dynamically changing number differs among a plurality of IP endpoints.

Most preferably, the step of partitioning includes dynamically re-assigning the multiple distinct identities to entities on the IP endpoint.

Preferably, the step of obtaining includes: (i) accessing, by the sender module, a server for obtaining the sender identity; and (ii) associating, by the server, the sender identity with the IP endpoint.

Most preferably, the associating is performed using a prefix code for encoding the multiple distinct identities.

Preferably, the step of tagging is performed using an identification field and a time-to-live (TTL) field.

Preferably, the sender module and the receiver module are components of a device independently selected from the group consisting of: a gateway and an IP endpoint.

According to the present invention, there is provided for the first time a device for enforcing network access control, the device including: (a) a sender module configured for: (i) upon sending an IP packet, obtaining a sender identity for a sender of the IP packet; and (ii) securely tagging the IP packet with the sender identity, wherein the IP packet includes a plurality of fixed-length fields, wherein the fixed-length fields are concatenated into a single fixed-length virtual field, and wherein the virtual field is shared between a cryptographic hash and an identity index for supporting multiple distinct identities residing on an IP endpoint.

Preferably, the sender module is further configured for: (iii) prior to the tagging, dynamically partitioning the virtual field to support a dynamically changing number of the multiple distinct identities for the IP endpoint, wherein the dynamically changing number differs among a plurality of IP endpoints.

Most preferably, the partitioning includes dynamically re-assigning the multiple distinct identities to entities on the IP endpoint.

Preferably, the obtaining includes: (A) accessing a server for obtaining the sender identity; and (B) associating, by the server, the sender identity with the IP endpoint.

Most preferably, the associating is performed using a prefix code for encoding the multiple distinct identities.

Preferably, the tagging is performed using an identification field and a time-to-live (TTL) field.

Preferably, the sender module is a component of a device selected from the group consisting of: a gateway and an IP endpoint.

According to the present invention, there is provided for the first time a device for enforcing network access control, the device including: (a) a receiver module configured for: (i) determining a sender identity by extracting the sender identity from an IP packet; (ii) checking the IP packet to ensure the IP packet has been appropriately tagged; and (iii) enforcing a security policy according to the sender identity.

Preferably, the receiver module is a component of a device selected from the group consisting of: a gateway and an IP endpoint.

According to the present invention, there is provided for the first time a computer-readable storage medium having computer-readable code embodied on the computer-readable storage medium, the computer-readable code including: (a)

program code for, upon sending an IP packet, obtaining, by a sender module, a sender identity for a sender of the IP packet; (b) program code for securely tagging, by the sender module, the IP packet with the sender identity, wherein the IP packet includes a plurality of fixed-length fields, wherein the fixed-length fields are concatenated into a single fixed-length virtual field, and wherein the virtual field is shared between a cryptographic hash and an identity index for supporting multiple distinct identities residing on an IP endpoint; (c) program code for determining, by a receiver module, the sender identity by extracting the sender identity from the IP packet; (d) program code for checking, by the receiver module, the IP packet to ensure the IP packet has been appropriately tagged; and (e) program code for enforcing a security policy, by the receiver module, according to the sender identity.

Preferably, the computer-readable code further includes: (f) program code for, prior to the tagging, dynamically partitioning, by the sender module, the virtual field to support a dynamically changing number of the multiple distinct identities for the IP endpoint, wherein the dynamically changing number differs among a plurality of IP endpoints.

Most preferably, the program code for partitioning includes program code for dynamically re-assigning the multiple distinct identities to entities on the IP endpoint.

Preferably, the program code for obtaining includes: (i) program code for accessing, by the sender module, a server for obtaining the sender identity; and (ii) program code for associating, by the server, the sender identity with the IP endpoint.

Most preferably, the program code for associating is operative using a prefix code for encoding the multiple distinct identities.

Preferably, the program code for tagging is operative using an identification field and a time-to-live (TTL) field.

Preferably, the sender module and the receiver module are components of a device independently selected from the group consisting of: a gateway and an IP endpoint.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods and devices for packet tagging using IP indexing via dynamic-length prefix code. The principles and operation for packet tagging using IP indexing via dynamic-length prefix code, according to the present invention, may be better understood with reference to the accompanying description and the drawings.

Figure 1:
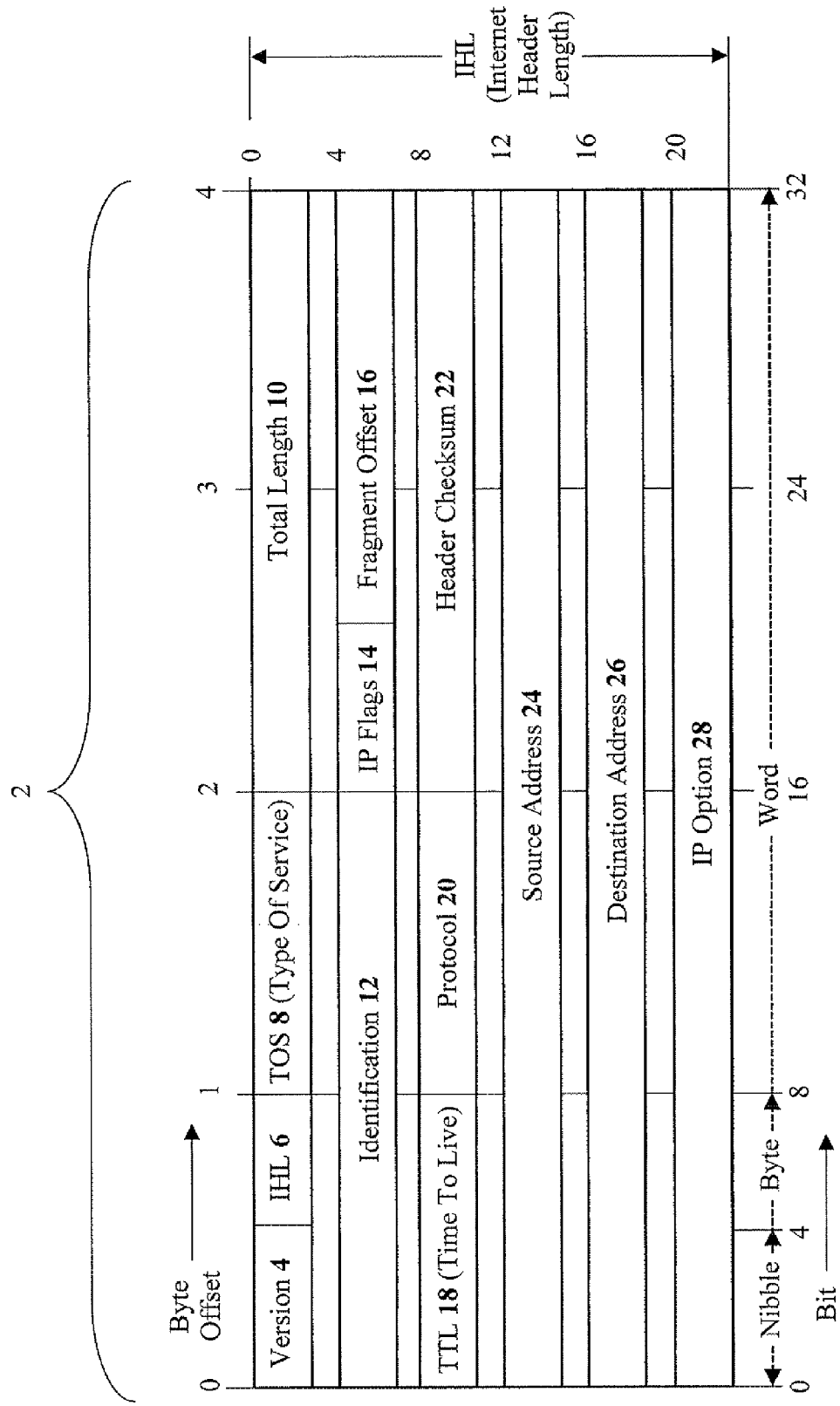
FIG. 1 shows the format of the field blocks of a typical IP-packet header, according to the prior art.

Referring now to the drawings, FIG. 1 shows the format of the field blocks of a typical IP-packet header, according to the prior art. FIG. 1 is adapted from FIG. 1 of Motil '462. An IP-packet header 2 is shown in FIG. 1 having various fields including: a version field 4, an IHL field 6 (Internet header length), a TOS field 8 (type of service), a total-length field 10, an identification field 12, an IP-flags field 14 (e.g. x, D, and M), a fragment-offset field 16, a TTL field 18 (time to live), a protocol field 20, a header-checksum field 22, a source-address field 24, a destination-address field 26, and an IP-option field 28 (an optional field that is not common).

The field position is indicated in FIG. 1 by an upper, horizontal, byte-offset axis. The header length (in units of 32 bits) is indicated in FIG. 1 by the right-side vertical axis. The field size (e.g. nibble, byte, word) is indicated in FIG. 1 by a lower, horizontal, bit axis.

In order to distinguish between different users that share the same IP address, when signing a packet, the packet is altered to have both the signature and an "index" of a specific user. The index is assigned by the Policy Decision Point (PDP) simply by managing a mapping from identity to key and index. The PEP, when validating the packet, checks that the packet is indeed signed using the signature corresponding to the specific index for the designated IP address.

The index needs to be located in IP-packet header 2. One possible field for placing the index is in the 4 most significant bits (MSB) of TTL field 18 in IP-packet header 2. TTL field 18 is set in the following way:

(1) the 4 MSB are set to the index (starting from 1) of the user using the designated IP address; and (2) the 4 least significant bits (LSB) are set to all ones.

Using such a scheme, the index of the PEP will remain unchanged, assuming that the PEP is within 16 "hops" from the client. Furthermore, the packet will not be dropped on the way to the destination, assuming that the destination is within 32 hops from the client (with the destination being "behind" the PEP). Since the value of TTL field 18 will always be ≥32 the 4 MSB will always represent a number ≥1.

The scheme described above is limited by the fact that the maximum number of identities behind each IP address is bounded by 15. However, not all IP addresses share multiple identities; most IP addresses represent only one identity, and can use the 4 additional "unused" TTL bits of TTL field 18 for a stronger signature.

An alternative approach is to treat the entire 20 bits (i.e. 16 bits of identification field 12 and 4 MSB of TTL field 18) as a whole, with a dynamic-length user index at the beginning encoded using prefix code. Prefix code is a code, typically a variable-length code, with the "prefix property" that no code word is a prefix of any other code word in the set. For example, a code with code words {0, 10, 11} has the prefix property; a code consisting of {0, 1, 10, 11} does not, because "1" is a prefix of both "10" and "11".

Using such an approach, it is not necessary to know in advance the maximum number of identities behind any IP address, allowing the signature to use all of the other bits. It is noted that as the number of identities behind a single IP address grows, the signature shrinks, lowering the level of security that can be provided.

It is important to point out the impetus for using such a prefix code. The IP packet includes several fixed-length fields (as described above with regard to FIG. 1) which are concatenated into a single fixed-length virtual field. The long virtual field, which consists of TTL field 18 and identification field 12, is partitioned into two areas: for the identity and a signature (i.e. hash value). Using a prefix code for the identity enables the receiver to determine where the identity part ends and where the signature part begins.

The identities are encoded in a way similar, though not identical, to Huffman coding. Huffman coding is an entropy-encoding algorithm used for lossless data compression. The term refers to the use of a variable-length code table for encoding a source symbol (such as a character in a file) where the variable-length code table has been derived in a particular way based on the estimated probability of occurrence for each possible value of the source symbol.

Figure 2:
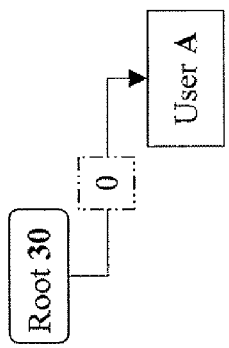
FIG. 2 is a binary tree of an exemplary scenario showing how identities are added to an IP address while maintaining their network identity, according to preferred embodiments of the present invention.

The encoding can be visualized using a binary tree. The code of an identity ("leaf") is the path to the leaf, using "1" for each branch to the left, and "0" for each branch to the right. FIG. 2 is a binary tree of an exemplary scenario showing how identities are added to an IP address while maintaining their network identity, according to preferred embodiments of the present invention. In this example, the initial depth is 1, and the growth rate is 2. A Root 30 serves as the initial internal node for enabling identities to be added to the tree as branches.

The PDP encounters the first identity (user A) behind an IP address. The PDP assigns user A the identity code "0" (depicted as a right branch in FIG. 2). When the PUP encounters the second identity (user B), the PDP does not assign it the identity code "1" because then the tree would be full, and would not be able to have identities assigned to additional users.

Figure 3:
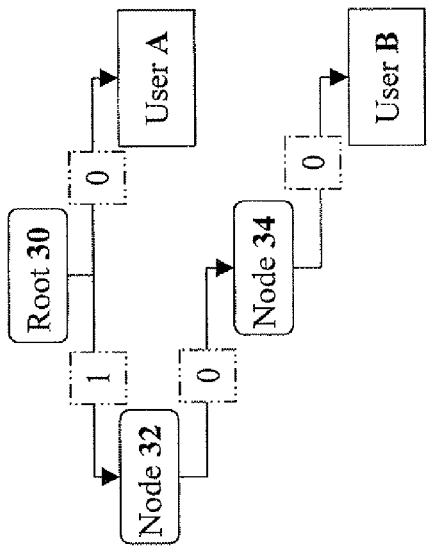
FIG. 3 is an extension of the binary tree of FIG. 2, according to preferred embodiments of the present invention.

Instead, the PDP splits the leaf two levels more, and gives user B the identity code "100". FIG. 3 is an extension of the binary tree of FIG. 2, according to preferred embodiments of the present invention. Internal nodes 32 and 34 (codes "1" and "10", respectively) serve as placeholders to enable additional identities to be assigned.

As more identities are encountered, identity codes are assigned from the lowermost level until only one unused leaf at the lowermost level is left remaining.

Figure 4:
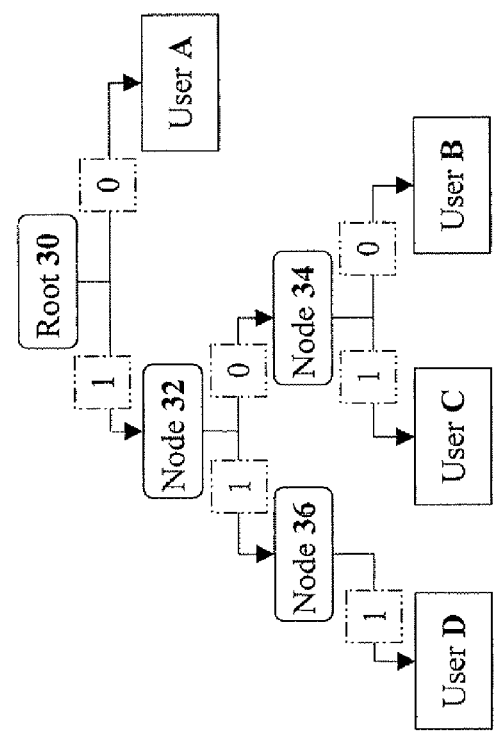
FIG. 4 is an extension of the binary tree of FIG. 3, according to preferred embodiments of the present invention.

FIG. 4 is an extension of the binary tree of FIG. 3, according to preferred embodiments of the present invention. User C is assigned the identity code "101" as a leaf from node 34, and user D is assigned the identity code "111" as a leaf from a node 36. The next identity that is encountered will require a leaf to be split again. Note, that continuing this way is highly inefficient; user A "blocks" the ability to assign identities to the right side of the tree.

Figure 5:
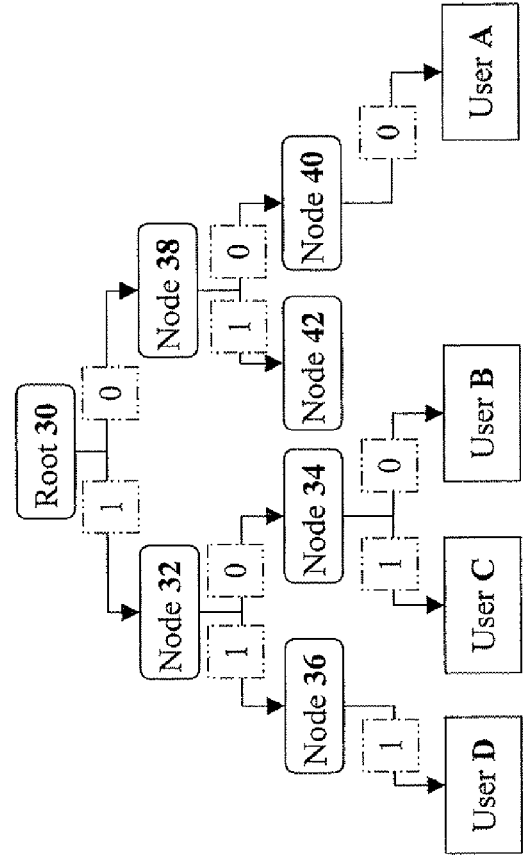
FIG. 5 is an extension of the binary tree of FIG. 4, according to preferred embodiments of the present invention.

FIG. 5 is an extension of the binary tree of FIG. 4, according to preferred embodiments of the present invention. On the first opportunity to communicate with user A, the identity code of user A is changed to an identity code from the lowermost level. Now, user A is re-assigned the identity code "000" as a leaf from a node 38, and a node 42 (code "01") is created to allow more identities to be added. New identities codes can be assigned (and reassigning) in order to maintain all of the leaves on the same level without completing (i.e. closing) the tree.

Figure 6:
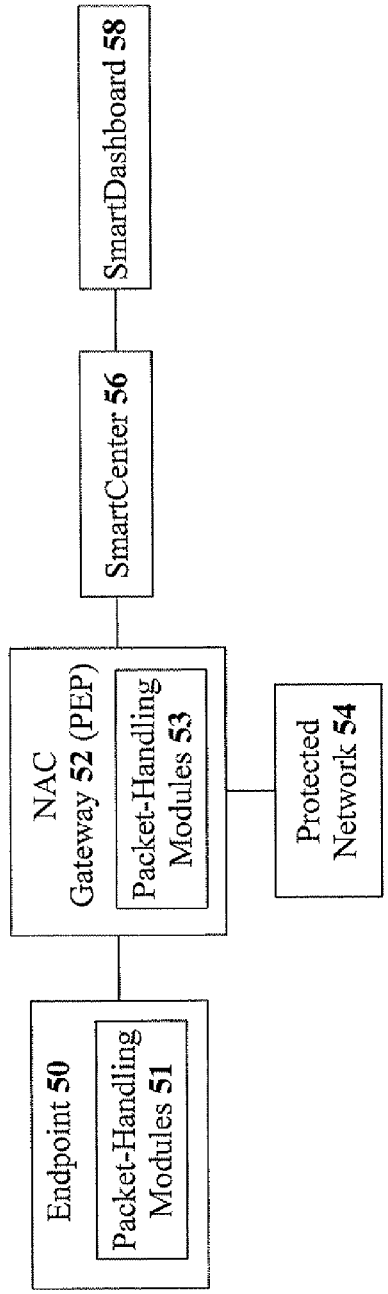
FIG. 6 is a simplified schematic block diagram of a packet-tagging system implemented in a typical endpoint-to-gateway network-architecture configuration, according to preferred embodiments of the present invention.

FIG. 6 is a simplified schematic block diagram of a packet-tagging system implemented in a typical endpoint-to-gateway network-architecture configuration, according to preferred embodiments of the present invention. An endpoint 50 (e.g. a client system), having packet-handling modules 51, is shown operationally connected to an NAC gateway 52 (also known as a policy enforcement point, PEP) having packet-handling modules 53. In various implementations, packet-handling modules 51 and 53 can include a sender module, a receiver module, or both. NAC gateway 52 (e.g. a server) protects any servers residing on a protected network 54 by allowing only duly-authenticated endpoints to communicate with the protected servers.

NAC gateway 52 is also operationally connected to security management servers. In preferred embodiments of the present invention, such servers are known as Check Point SmartCenter 56 and Check Point SmartDashboard 58. Specifically, SmartDashboard 58 is a graphical management console, and SmartCenter 56 is a security management server, which stores and distributes the management configuration (and typically includes a policy decision point, PDP). SmartCenter 56 and SmartDashboard 58 determine the access-control policy.

Figure 7:
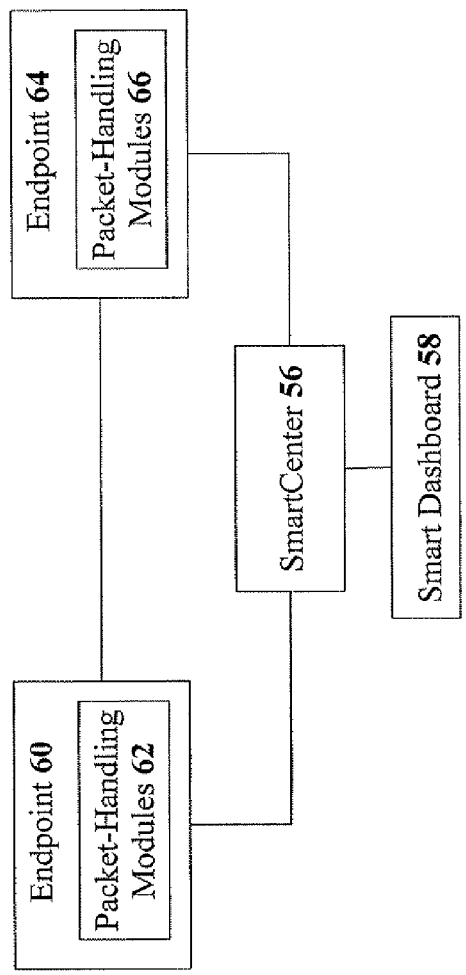
FIG. 7 is a simplified schematic block diagram of a packet-tagging system implemented in a typical endpoint-to-endpoint network-architecture configuration, according to preferred embodiments of the present invention.

FIG. 7 is a simplified schematic block diagram of a packet-tagging system implemented in a typical endpoint-to-endpoint network-architecture configuration, according to preferred embodiments of the present invention. An endpoint 60, having packet-handling modules 62, and an endpoint 64, having packet-handling modules 66, are shown operationally connected to each other. In various implementations, packet-handling modules 62 and 66 can include a sender module, a receiver module, or both. Endpoints 60 and 64 both communicate with the PDP embedded in SmartCenter 56 (managed by SmartDashboard 58) to regulate NAC for network packets.

Figure 8:
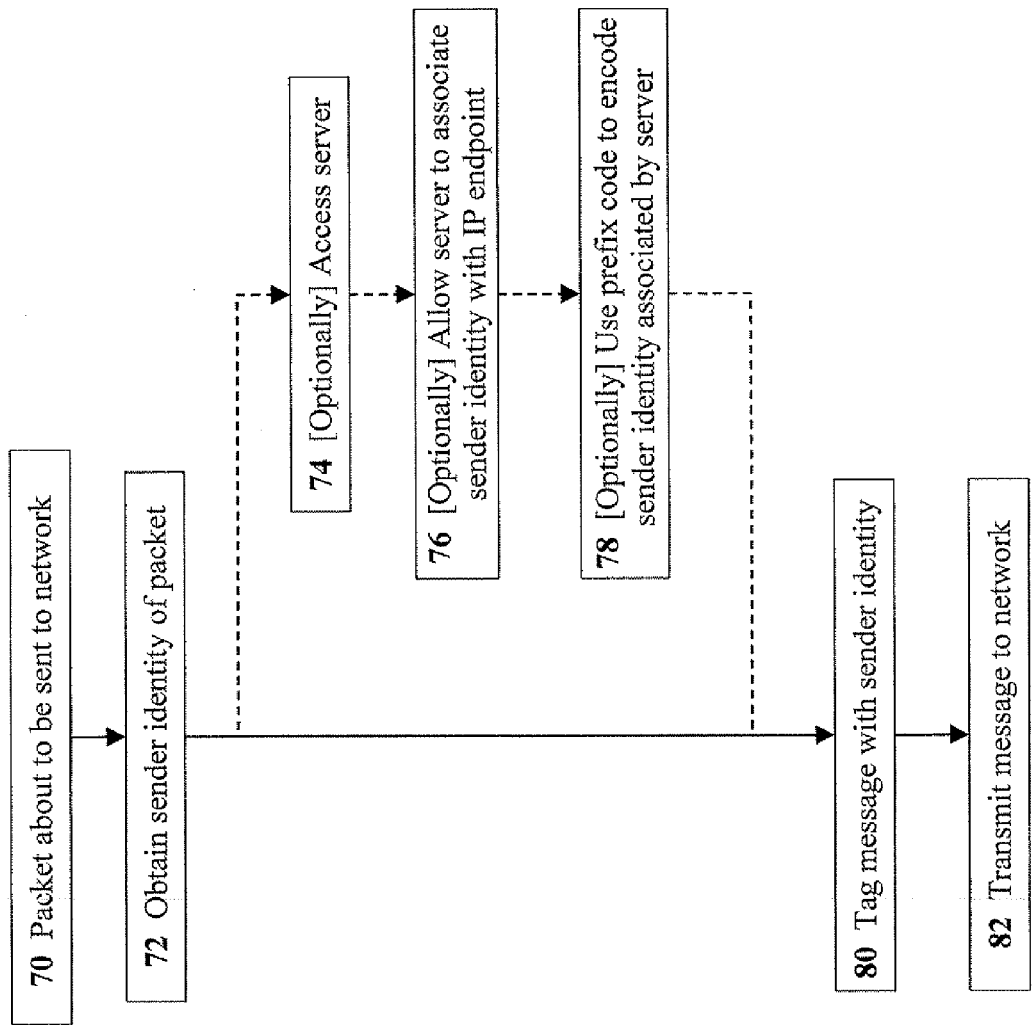
FIG. 8 is a simplified flowchart of a packet-tagging sender procedure for an IP packet about to be sent to a network, according to preferred embodiments of the present invention.

FIG. 8 is a simplified flowchart of a packet-tagging sender procedure for an IP packet about to be sent to a network, according to preferred embodiments of the present invention. The process starts when an IP packet is about to be sent to a network by a sender module (e.g. a gateway or an IP endpoint) (Step 70). The sender module obtains a sender identity for a sender of the IP packet (Step 72). The sender module can access a server for obtaining the sender identity (Step 74), allowing the server to associate the sender identity with an IP endpoint (Step 76). A prefix code for encoding the distinct identities can be used by the server to associate the sender identity as described above with regard to FIGS. 2-5 (Step 78).

The IP packet includes several fixed-length fields which are concatenated into a single fixed-length virtual field. The virtual field is shared between a cryptographic hash and an identity index for supporting multiple distinct identities residing on an IP endpoint.

The sender module then securely tags the IP packet with the sender identity (Step 80). The tagging procedure can be performed using an identification field and a TTL field of the IP packet. The IP packet is then transmitted to the network (Step 82).

Figure 9:
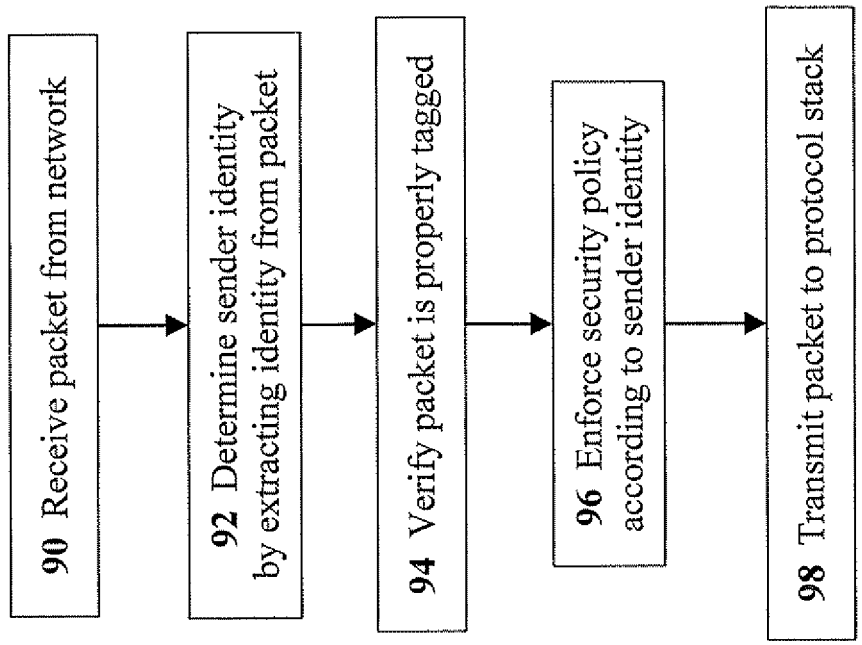
FIG. 9 is a simplified flowchart of a packet-tagging receiver procedure for an IP packet received from a network, according to preferred embodiments of the present invention.

FIG. 9 is a simplified flowchart of a packet-tagging receiver procedure for an IP packet received from a network, according to preferred embodiments of the present invention. The process starts when an IP packet is received from a network by a receiver module (e.g. a gateway or an IP endpoint) (Step 90). The receiver module determines the sender identity by extracting the sender identity from the IP packet (Step 92).

The receiver module then performs a verification procedure to ensure that the IP packet was properly tagged (Step 94). The receiver module then enforces a security policy according to the sender identity (Step 96). The IP packet is then transmitted to the protocol stack (Step 98).

While the invention has been described with respect to a limited number of embodiments, it will be appreciated that many variations, modifications, and other applications of the invention may be made.

What is claimed is:

1. A method for packet tagging, the method comprising the steps of:
   obtaining, by a sender module, a sender identity for a sender of said IP packet, upon sending an internet-protocol (IP) packet;
   tagging, by said sender module, said IP packet with said sender identity, to enable a receiver to authenticate the sender identity after receiving said IP packet, wherein said IP packet includes a plurality of fixed-length fields, wherein two of said fixed-length fields are concatenated into a single fixed-length virtual field, wherein said virtual field is shared between a cryptographic hash and an identity index for supporting multiple distinct identities residing on an IP endpoint, and wherein tagging is performed using an identification field and a time-to-live (TTL) field; and
   prior to said step of tagging, dynamically partitioning, by said sender module, said virtual field between said cryptographic hash and said identity index, to support a dynamically changing number of said multiple distinct identities for said IP endpoint, wherein said dynamically changing number differs among a plurality of IP endpoints, and wherein the said partitioning is effected in response to a change in a number of multiple distinct identities.

2. The method of claim 1, wherein said step of partitioning includes dynamically re-assigning said multiple distinct identities to entities on said IP endpoint.

3. The method of claim 1, wherein said step of obtaining includes:
   (i) accessing, by said sender module, a server for obtaining said sender identity; and
   (ii) associating, by said server, said sender identity with said IP endpoint.

4. The method of claim 3, wherein said associating is performed using a prefix code for encoding said multiple distinct identities.

5. The method of claim 4, wherein no code word of said prefix code is a prefix of any other code word of said prefix code.

6. The method of claim 1, wherein said sender module is a component of a device selected from the group consisting of: a gateway and an IP endpoint.

7. The method of claim 1, further comprising the steps of:
   (d) determining, by a receiver module, said sender identity by extracting said sender identity from said IP packet;
   (e) checking, by said receiver module, said IP packet to ensure said IP packet has been appropriately tagged; and
   (f) enforcing a security policy, by said receiver module, according to said sender identity.

8. The method of claim 7, wherein said receiver module is a component of a device selected from the group consisting of: a gateway and an IP endpoint.

9. The method of claim 1, wherein said identity index is separate from said cryptographic hash.

10. A non-transitory computer-readable storage medium having computer-readable code embodied on the computer-readable storage medium, the computer-readable code comprising:
    program code for obtaining, by a sender module, a sender identity for a sender of said IP packet, upon sending an internet-protocol (IP) packet;
    program code for securely tagging, by said sender module, said IP packet with said sender identity, to enable a receiver to authenticate the sender identity after receiving said IP packet, wherein said IP packet includes a plurality of fixed-length fields, wherein two of said fixed-length fields are concatenated into a single fixed-length virtual field, wherein said virtual field is shared between a cryptographic hash and an identity index for supporting multiple distinct identities residing on an IP endpoint, and wherein tagging is performed using an identification field and a time-to-live (TTL) field; and
    program code for, prior to said step of tagging, dynamically partitioning, by said sender module, said virtual field between said cryptographic hash and said identity index, to support a dynamically changing number of said multiple distinct identities for said IP endpoint, wherein said dynamically changing number differs among a plurality of IP endpoints, and wherein the said partitioning is effected in response to a change in a number of multiple distinct identities.

11. The storage medium of claim 10, wherein said program code for partitioning includes program code for dynamically re-assigning said multiple distinct identities to entities on said IP endpoint.

12. The storage medium of claim 10, wherein said program code for obtaining includes:
    (i) program code for accessing, by said sender module, a server for obtaining said sender identity; and
    (ii) program code for associating, by said server, said sender identity with said IP endpoint.

13. The storage medium of claim 12, wherein said program code for associating is operative using a prefix code for encoding said multiple distinct identities.

14. The storage medium of claim 13, wherein no code word of said prefix code is a prefix of any other code word of said prefix code.

15. The storage medium of claim 10, wherein said sender module is a component of a device selected from the group consisting of: a gateway and an IP endpoint.

16. The storage medium of claim 10, the computer-readable code further comprising:
    (d) program code for determining, by a receiver module, said sender identity by extracting said sender identity from said IP packet;
    (e) program code for checking, by said receiver module, said IP packet to ensure said IP packet has been appropriately tagged; and
    (f) program code for enforcing a security policy, by said receiver module, according to said sender identity.

17. The storage medium of claim 16, wherein said receiver module is a component of a device selected from the group consisting of: a gateway and an IP endpoint.

18. The storage medium of claim 10, wherein said identity index is separate from said cryptographic hash.

* * * * *